US008526791B2

(12) United States Patent
Nakamura et al.

(10) Patent No.: US 8,526,791 B2
(45) Date of Patent: Sep. 3, 2013

(54) PLAYBACK APPARATUS

(75) Inventors: Taku Nakamura, Yokohama (JP);
Hiroki Mizosoe, Kawasaki (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 1600 days.

(21) Appl. No.: 11/478,620

(22) Filed: Jul. 3, 2006

(65) Prior Publication Data

US 2007/0071397 A1 Mar. 29, 2007

(30) Foreign Application Priority Data

Sep. 27, 2005 (JP) ................................. 2005-279024

(51) Int. Cl.
*H04N 9/80* (2006.01)

(52) U.S. Cl.
USPC ........................................................ 386/248

(58) Field of Classification Search
USPC ................. 386/200, 239, 240, 244, 245, 246, 386/353
See application file for complete search history.

(56) References Cited

U.S. PATENT DOCUMENTS

| 5,796,828 | A  | * | 8/1998  | Tsukamoto et al. ........... 380/203 |
| 6,141,483 | A  |   | 10/2000 | Yamada et al. |
| 6,580,870 | B1 | * | 6/2003  | Kanazawa et al. ............ 386/240 |
| 7,519,273 | B2 | * | 4/2009  | Lowthert et al. ............. 386/248 |
| 2001/0029584 | A1 | | 10/2001 | Van De Haar |
| 2001/0055466 | A1 | | 12/2001 | Iwashita |
| 2002/0104096 | A1 | | 8/2002  | Cramer et al. |
| 2002/0144262 | A1 | | 10/2002 | Plotnick et al. |
| 2003/0028873 | A1 | | 2/2003  | Lemmons |
| 2003/0061489 | A1 | * | 3/2003  | Pelly et al. ................... 713/176 |
| 2003/0123853 | A1 | * | 7/2003  | Iwahara et al. ................. 386/69 |
| 2003/0170000 | A1 | * | 9/2003  | Iwashita et al. ................ 386/46 |
| 2004/0126095 | A1 | * | 7/2004  | Tsumagari et al. ............. 386/95 |
| 2004/0175154 | A1 | * | 9/2004  | Yoon et al. .................... 386/96 |
| 2004/0226043 | A1 | | 11/2004 | Mettu et al. |
| 2005/0114214 | A1 | | 5/2005  | Itoh |
| 2005/0144201 | A1 | | 6/2005  | Itoh |
| 2006/0195875 | A1 | | 8/2006  | LeComte |

FOREIGN PATENT DOCUMENTS

| CN | 1484445 A | 3/2004 |
| FR | 2 853 786 A1 | 10/2004 |
| JP | 08-111832 | 4/1996 |
| JP | 9-51522 | 2/1997 |
| JP | 11-098467 A | 4/1999 |
| JP | 11-110914 | 4/1999 |
| JP | 11-110914 A | 4/1999 |

(Continued)

OTHER PUBLICATIONS

Japanese Office Action, issued in Japanese Patent Application No. 2005-279024, dated May 18, 2010.

(Continued)

*Primary Examiner* — Tat Chio
(74) *Attorney, Agent, or Firm* — McDermott Will & Emery LLP

(57) ABSTRACT

An area not displayed by a first stream recorded in a disk is complemented by a second stream which is transmitted from a server through a network to a playback apparatus. A picture represented by the second stream is superimposed on a picture represented by the first stream to display a complete picture. A sound included in the second stream is also mixed with a sound included in the first stream to output a complete sound.

20 Claims, 9 Drawing Sheets

(56) References Cited

FOREIGN PATENT DOCUMENTS

| JP | 2000-134588 | 5/2000 |
| JP | 2000-165335 | 6/2000 |
| JP | 2001-346126 | 12/2001 |
| JP | 2002-101390 A | 4/2002 |
| JP | 2003-52031 | 2/2003 |
| JP | 2004-079055 | 3/2004 |
| JP | 2004-079055 A | 3/2004 |
| JP | 2005-064777 | 3/2005 |
| JP | 2005-156996 A | 6/2005 |
| JP | 2005-176240 A | 6/2005 |
| WO | WO 00/27123 | 5/2000 |
| WO | WO 03/041388 A2 | 5/2003 |
| WO | WO 2004/084523 A1 | 9/2004 |
| WO | WO 2005/020578 A1 | 3/2005 |

OTHER PUBLICATIONS

Chinese Office Action issued in Chinese Patent Application No. 200610106311.1, dated Jun. 28, 2010.
European Search Report issued in European Patent Application No. EP 06 25 3436.7 dated Sep. 29, 2009.
Japanese Office Action issued in Japanese Patent Application No. JP 2005-279024 dated Jan. 4, 2011.
European Search Report issued in application No. 06 253 436.7 issued on Jun. 5, 2012.
Office Action dated Oct. 12, 2012 in Japanese Patent Application No. 2011-218858.

\* cited by examiner

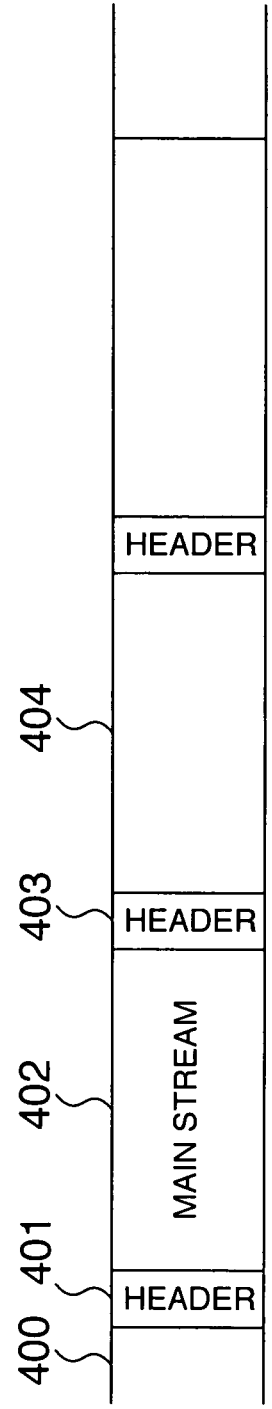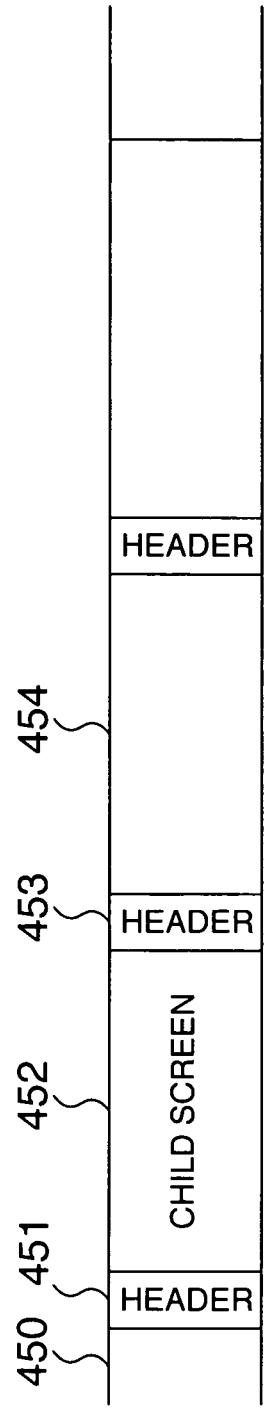

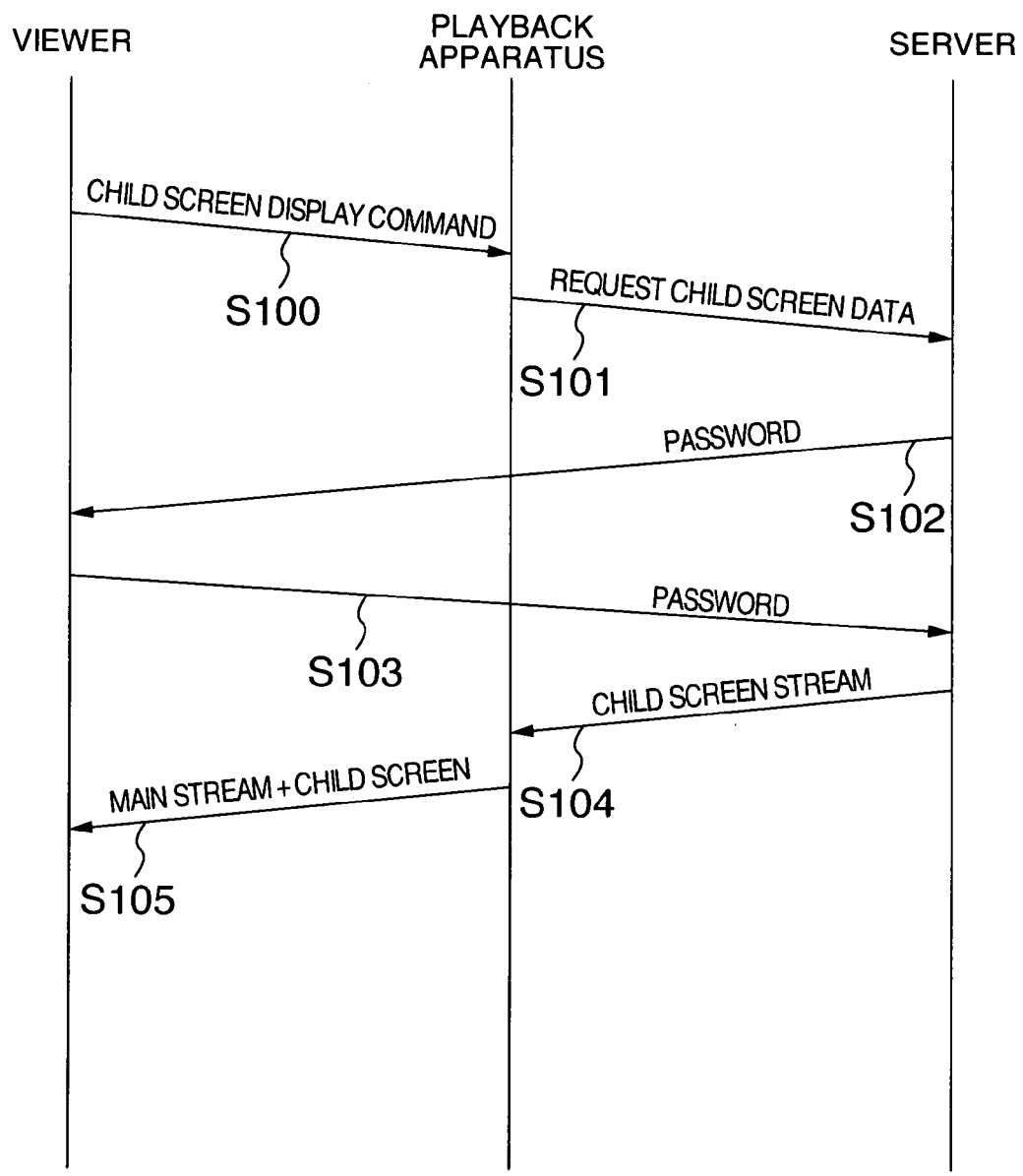

PLAYBACK APPARATUS

INCORPORATION BY REFERENCE

The present application claims priority from Japanese application JP2005-279024 filed on Sep. 27, 2005, the content of which is hereby incorporated by reference into this application.

BACKGROUND OF THE INVENTION

The present invention relates to a playback apparatus for playing back pictures.

A background art in the field related to the present invention is described, for example, in JP-A-8-111832. JP-A-8-111832 is intended to provide "a television receiver which is capable of readily setting movements of caption information." In the television receiver, an image represented by a video signal and having caption information 42 is displayed on a child screen 41, which is produced by a PinP function with an original aspect ratio being substantially maintained. Then, a cursor line 44 is displayed on the child screen 41 for setting a movement of the caption information 42. The caption information 42 is moved to a position specified by the cursor line 44, and displayed on the parent screen.

Another background art is described, for example, in JP-A-2001-346126. JP-A-2001-346126 is intended for use when an image transmitted through a network is displayed on a home television receiver, in order to adjust the image to an optimal size for the display screen of the television receiver. Specifically, a receiver 12 receives an image signal transmitted through a network 11. A signal converter 13 converts the received image signal to a video signal which is then displayed on a television receiver 14. An image size adjuster 13 scales up or down the displayed image to freely adjust the image size in accordance with the display screen of the television receiver 14.

SUMMARY OF THE INVENTION

Standardization is being laid down for BD (Blu-ray Disk) and HD DVD (High Definition DVD) which are regarded as next-generation recording media. Unlike conventional DVD, network-based services are also taken into considered for these media, not to mention a high resolution of pictures. The media are also standardized to support a PiP (Picture in Picture) function for displaying one picture superimposed on another picture to play back a different picture on a child screen in synchronism with a picture of a main part. The child screen used in PiP can play back not only pictures directly recorded on a disk, but also pictures downloaded through a network. The use of the network enables services to be continued even in package media which have not conventionally permitted addition/change of contents.

The conventional DVD supports a parental lock function for limiting viewing of violent scenes and educationally unfavorable scenes through associated settings in a playback apparatus. However, the parental lock function is set in individual playback apparatus, and is therefore easily released, thus implying a problem of security.

For the next-generation recording media, standardization has been considered for a function of displaying an additional picture on a child screen using a network, and outputting the additional picture in synchronism with a picture played back from a medium. However, no consideration is taken for providing a service for displaying a complete picture by acquiring complementary fragments from a network using the foregoing function, and fitting them into a picture, which is recorded on a commercial recording medium so as not to display a portion thereof. By receiving the complementary fragments through the network, authentication required to acquire the complementary fragments can be carried out through the Internet, thus enabling more secure identification. Also, since a recording medium records incomplete pictures, part of which is dropped, the recording medium can record information for a longer time than a recording medium which records a whole stream. Further, a plurality of pictures whose resolutions are different from each other may be provided for viewers to acquire through the network, where an extra fee is charged for acquisition of a picture of a higher resolution so that a content provider earns incomes of service even after a package has been sold. In addition, if a viewer wishes to intentionally conceal part of pictures recorded on a recording medium, a child screen can be used to conceal such pictures.

However, when JP-A-8-111832 is applied to implement the foregoing function, a viewer is required to specify the position of a child screen associated with PinP. When the child screen is moved within the parent screen, the viewer will experience difficulties in the positioning in each frame. The technique shown in JP-A-2001-346126 is incapable of synchronizing a picture of a main part with a picture acquired from a network.

Accordingly, importance should be placed on a playback apparatus which is suitable for allowing a viewer to select a content in accordance with his purpose in a PinP screen which displays a main screen and a child screen in synchronism with each other.

The present invention is intended to improve the usability of a playback apparatus.

The above object is achieved by inventions described in claims.

According to the present invention, the playback apparatus provides an improved usability.

BRIEF DESCRIPTION OF THE DRAWINGS

These and other features, objects and advantages of the present invention will become more apparent from the following description when taken in conjunction with the accompanying drawings, wherein:

FIGS. 2A, 2B are diagrams each illustrating the structure of a stream;

FIG. 3 is a flow diagram illustrating a sequence for acquiring a stream for a child screen;

DETAILED DESCRIPTION OF THE EMBODIMENTS

In the following, embodiments of the present invention will be described with reference to the accompanying drawings.

First Embodiment

Figure 1:
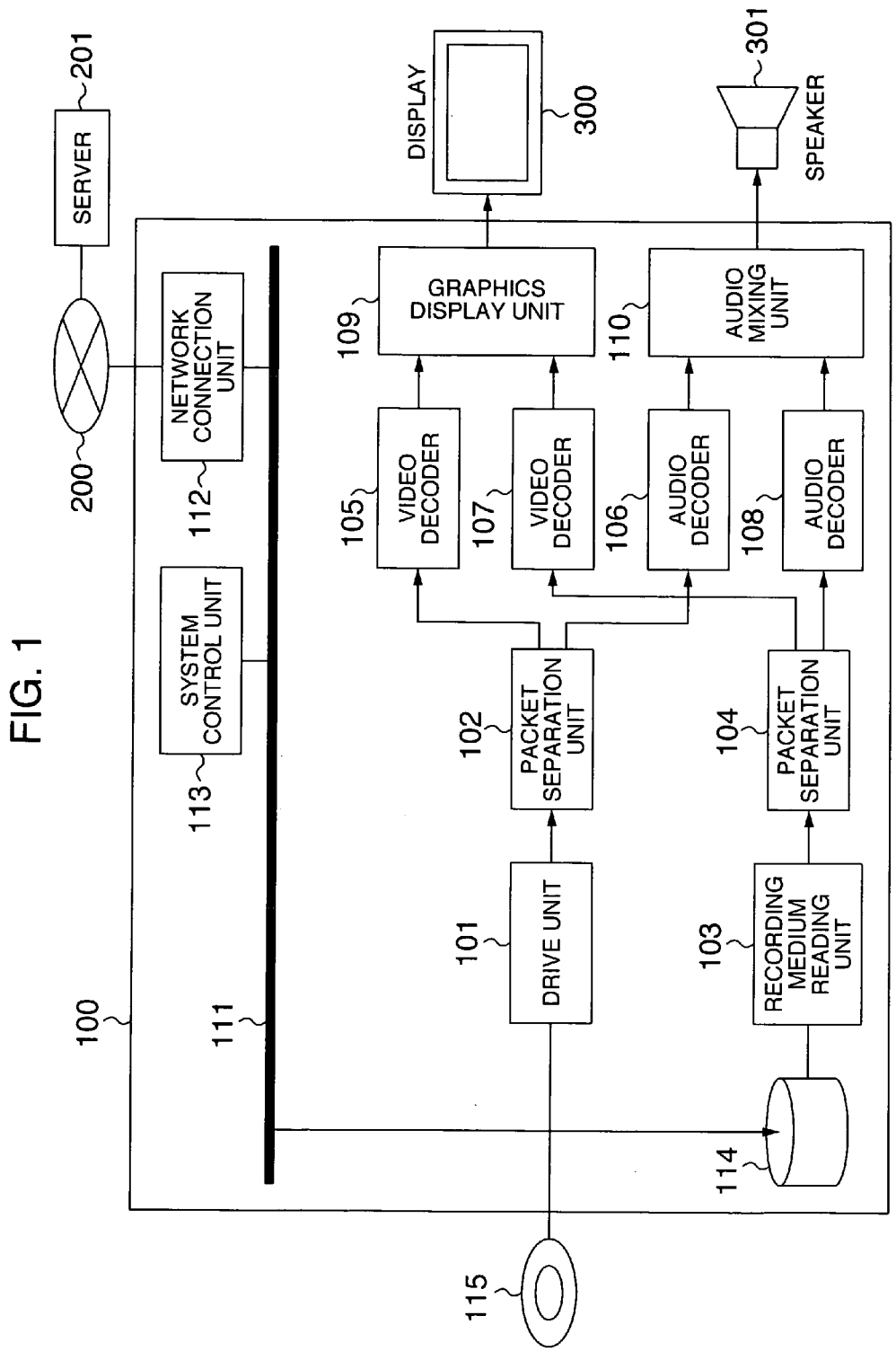
FIG. 1 is a block diagram illustrating the configuration of a first embodiment according to the present invention.

FIG. 1 illustrates a playback apparatus according to a first embodiment of the present invention. The playback apparatus 100 comprises a drive unit 101, a recording medium 114, a recording medium I/O unit 103, a first packet separation unit 102, a second packet separation unit 104, a first video decoder 105, a second video decoder 107, a first audio decoder 106, a second audio decoder 108, a graphics display unit 109, an audio mixing unit 110, a network connection unit 112, and a system control unit 113.

A description will be given of the flow of signals when a main stream is read from a disk 115, a stream for a child screen is read from a server 201 through a network 200, and they are multiplexed and outputted from a display 300 and a speaker 301. The drive unit 101 reads the stream from the disk 115, and outputs the read stream to the first packet separation unit 102. The first packet separation unit 102 separates the stream into a video stream and an audio stream. The first video decoder 105 decodes the video stream to output a video signal. The first audio decoder 105 decodes the audio stream to output an audio signal. The network connection unit 112 receives a control signal from the system control unit 113 through a bus 111, and accesses the server 201 through the network 200. The server 201 transmits a stream for a child screen to the playback apparatus 100. Network connection unit 112 receives the stream for a child screen, and writes the stream into the recording medium 114 through the bus 111 and recording medium 1/O unit 103. The second packet separation unit 104 reads the child screen stream from the recording medium I/O unit 103, and separates the stream into a video stream and an audio stream. The second video decoder 107 decodes the video stream to output a video signal. The second audio decoder 108 decodes the audio stream to output an audio signal. The graphics display unit 109 receives the video signals outputted from the first video decoder 105 and second video decoder 107, and superimposes two screens under the control of the system control unit 113. The audio mixing unit 110 receives the audio signals outputted from the first audio decoder 106 and second audio decoder 108, and mixes sounds under the control of the system control unit 113. The superimposed pictures and mixed sounds are outputted from the display 301 and speaker 301, respectively. In the foregoing description, the child screen stream is superimposed on the main stream to output a composite picture, but the main stream alone can be outputted as well. However, since the latter case is similar to normal playback, a detailed description thereon is omitted.

Referring next to FIGS. 2A, 2B, a description will be given of a method of playing back a main stream and a child screen stream in synchronism with each other. In FIGS. 2A, 2B, a stream 400 represents a main stream, and a stream 450 represents a child screen stream. The stream 400 may be composed in a format called TS (Transport Stream). The stream 400 comprises a fixed-length header 401, and a packet 402. The header 401 contains information on a format associated with a stream contained in the packet 401, for example, MPEG-2, MPEG-4, AVC or the like, time PTS (Presentation Time Stamp) indicative of the time at which the stream contained in the packet 402 is displayed, and the like. While the stream 450 has a similar structure, a header 451 contains information on a position at which a child screen is outputted. The packet separation units 102, 104 control the output timing using PTS included in the headers to output the main stream in synchronism with the child screen stream. When the child screen stream is received from the server 201, authentication may be performed to limit viewers.

A procedure of the authentication will be described with reference to FIG. 3. The user displays a child screen on the playback apparatus 100 (S100). The playback apparatus 100 requests the server 201 to transmit a stream for the child screen thereto (S101). The server 201 prompts the viewer to enter a password through the playback apparatus 100 when the stream for the child screen is limited in delivery (S102). The viewer returns the password through the playback apparatus 100 (S103). The server 201 receives the password for matching. When the viewer is successfully authenticated as a result of the matching, the server 201 transmits the child screen stream (S104). The playback apparatus 100 receives the child screen stream, superimposes the child screen stream on the main stream, and outputs the composite stream (S105). While a password is used for authenticating the user in the foregoing example, a different authentication method may be employed, including, for example, a card number for authentication, and biometrics-based authentication such as fingerprint authentication and iris authentication.

With the foregoing configuration and control, the screen can be controlled as illustrated in FIGS. 4-7.

Figure 4:
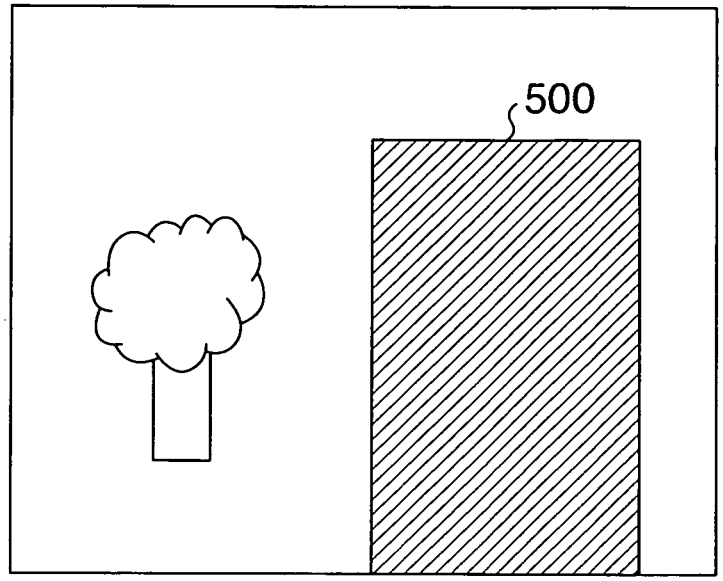
FIG. 4 is a diagram illustrating a picture of a main stream.
Figure 5:
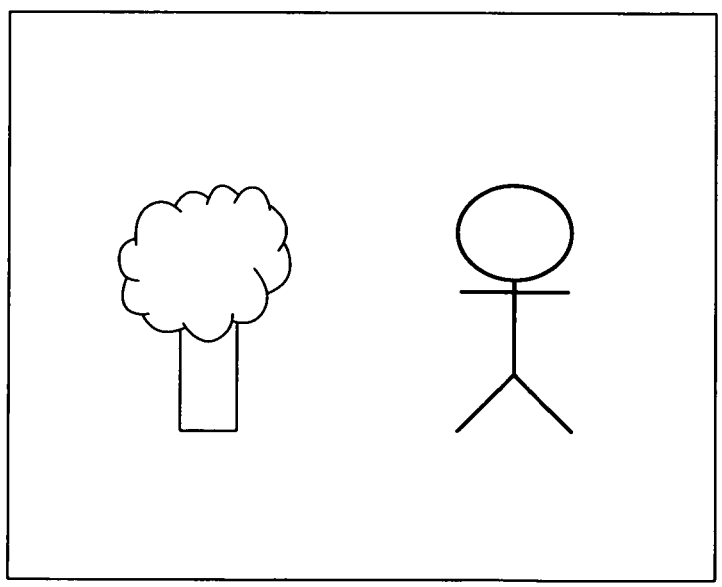
FIG. 5 is a diagram showing a picture composed of a main stream and a child screen stream superimposed on the main stream.
Figure 6:
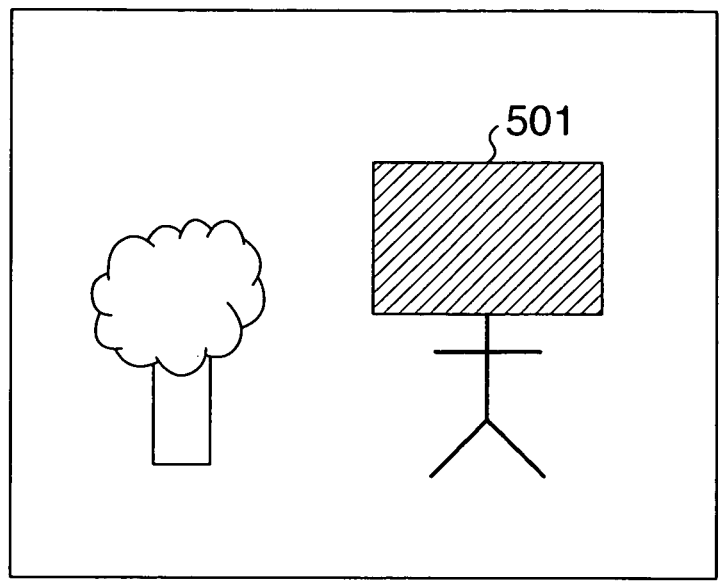
FIG. 6 is a diagram showing a picture composed of a main stream and a child screen stream superimposed on the main stream.
Figure 7:
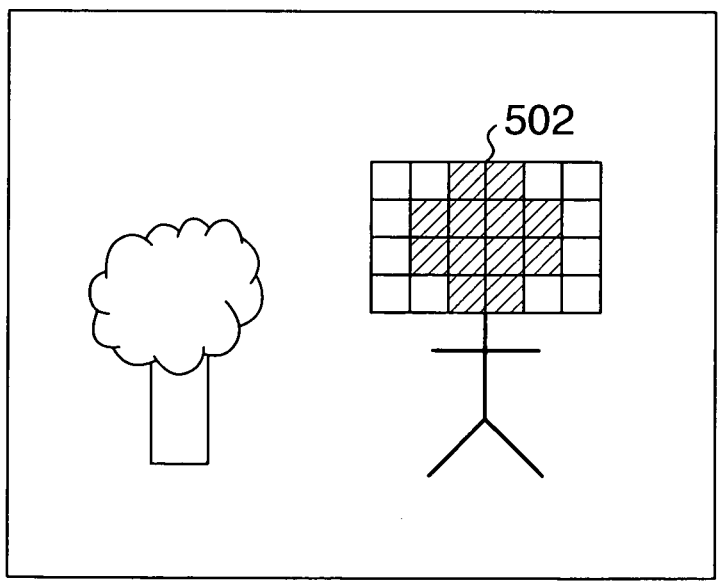
FIG. 7 is a diagram showing a picture composed of a main stream and a child screen stream superimposed on the main stream.

FIG. 4 illustrates a picture included in a main stream, where an area 500 is defined in the right half of the screen to conceal part of the screen. The area 500 conceals a certain person, and as the person moves within the screen, the area 500 also moves in response to movements of the person. When the viewer is successfully authenticated, the overall screen is complemented by a picture in a child screen to fill the area 500, as illustrated in FIG. 5, so that the viewer can view the entire picture including the person. While part of the screen can be concealed or replaced with another picture through appropriate settings of the playback apparatus even with a conventional DVD, the authentication performed through a network, as in this embodiment, can increase the certainty of the authentication and improve the reliability of information concealment. Alternatively, as illustrated in FIG. 6, only part of the screen may be displayed, while an area 501 is left concealed, depending on a particular authentication method. Further alternatively, the resolution may be degraded in an area 502, as illustrated in FIG. 7, when the screen is displayed. Thus, picture assets can be more flexibly managed by outputting the picture in the child screen step by step, as illustrated in FIGS. 6 and 7, depending on the authentication.

In the example described above, a stream is displayed in a child screen when the viewer is successfully authenticated. Alternatively, instead of the authentication, the viewer may be charged by the server 201 before the stream is delivered for the child screen. The viewer can be served in accordance with a video quality required by him by changing an area to be displayed and/or the resolution depending on the fee paid by the viewer.

In the authentication described above, the user's age or paying capability can be used instead of the password. Specifically, an age limit may be imposed on the viewing of a child screen picture, where it can be determined in the server 201 whether or not the user violates the age limit. In this event, the user can also enter the age through the playback apparatus 100, in a manner similar to the password, for transmission to the server, but more preferably, age information has been previously stored on an authentication card through a predetermined procedure, and this age information is preferably transmitted to the server. In this way, the age limit can be practiced with higher certainty. On the other hand, in the event of charging, the server can determine whether or not the user is capable of paying the fee by authenticating a credit card through a network or the like. In this way, delays in payment and non-payment can be prevented for charging to paid contents.

Second Embodiment

Figure 8:
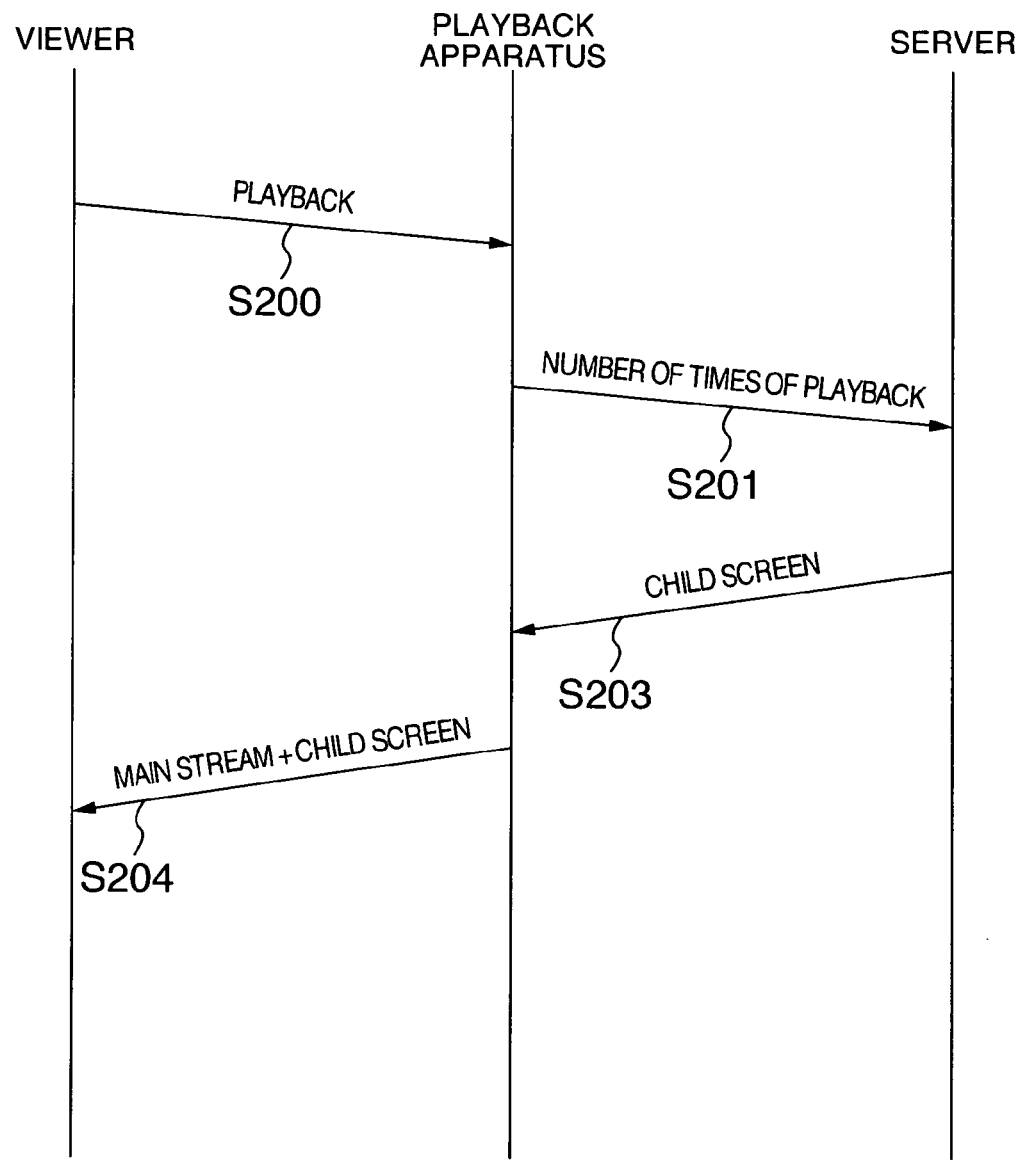
FIG. 8 is a flow diagram illustrating a sequence in a second embodiment of the present invention.

A second embodiment of the present invention will be described with reference to FIG. 8. Since the playback apparatus 100 is similar in configuration to the first embodiment, a description thereon is omitted. In the second embodiment, as a viewer plays back a main stream (S200), the system control unit 113 contained in the playback apparatus 100 transmits the number of times the main stream has been played back to the server 201 (S201). The server 201 has a plurality of child screen streams, and upon receipt of the number of times of playback, transmits a child screen to the playback apparatus 100 in accordance with the number of times (S203). The playback apparatus 100 superimposes the child screen stream on the main picture, and plays back the composite picture (S204).

Figure 9:
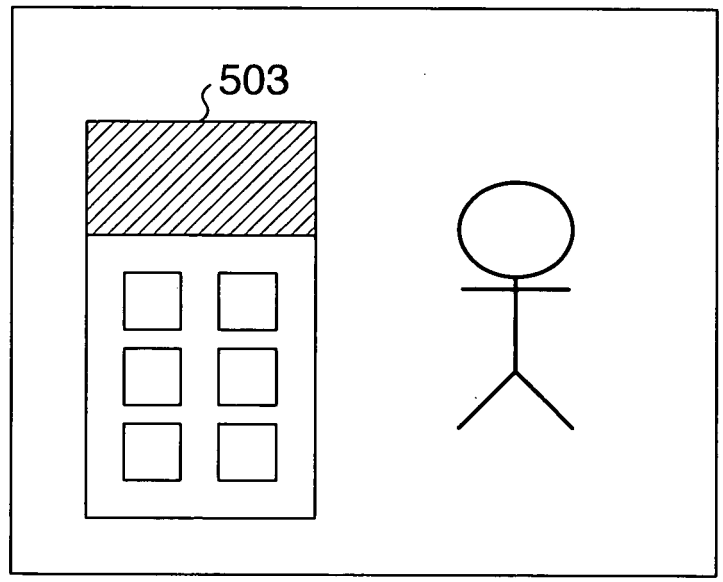
FIG. 9 is a diagram illustrating a main stream picture in the second embodiment of the present invention.

The foregoing control permits the main stream to be composed such that video contents change each time the main stream is played back. For example, as illustrated in FIG. 9, an advertisement 503 on a building may be changed depending on the number of times of playback to provide a higher effectiveness of advertising.

In the example described above, the number of times of playback is transmitted to the server 201, but instead, the date and time may be transmitted to the server 201. Alternatively, based on a timer contained in the server 201, a child screen stream may be selected for transmission in accordance with the date and time at which the user accesses for acquisition of a child screen stream. When the server 201 provides an appropriate picture depending on a particular playback date and time, a timely advertisement can be displayed on the playback apparatus 100.

Alternatively, instead of the playback apparatus 100, the server 201 may store the number of times of playback. In this event, ID unique to a recording medium is transmitted to the server 201, such that the server 201 receives this ID and stores the number of times the server 201 has transmitted a child screen stream. In this way, the server 201 can advantageously keep track of the number of time each content has been played back.

In addition, the ID unique to a recording medium can include an area code indicative of an area in which the recording medium is sold, such that the server 201 can determine, using this area code, whether or not a child screen stream should be transmitted. In this event, the playback apparatus 100 transmits information indicative of the area in which it is installed, together with the ID, to the server 201, and the server 201 determines whether or not a child screen stream should be transmitted, based on the area code included in the ID and the information indicative of the area in which the playback apparatus 100 is installed.

Third Embodiment

Figure 10:
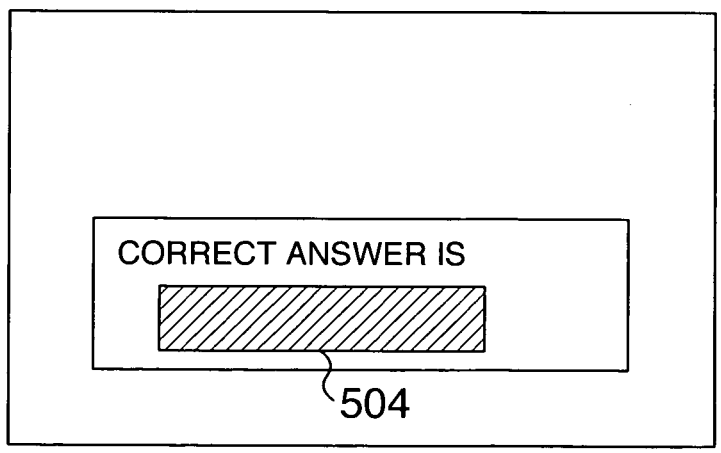
FIG. 10 illustrates a picture played back in a third embodiment of the present invention.

A third embodiment of the present invention will be described with reference to FIG. 10. Since the playback apparatus 100 is similar in configuration to the first embodiment, a description thereon is omitted. The third embodiment will be described in connection with a method which is utilized by a viewer when he is not willing to view part of a picture in a main stream. As illustrated in FIG. 10, when a main stream presents a quiz program, where a correct answer is displayed beforehand to viewers, some viewers do not want to know the correct answer. In this event, such viewers can cause a child screen to appear so that an area 504 is concealed. In addition, a sound may be generated together with a child screen stream in order to cancel out a sound associated with the main stream.

In the foregoing configuration, the child screen stream is retrieved from the server 201, however, in the third embodiment, the child screen stream may be stored in the disk 115 to avoid an access to the server 201. In this configuration, the network connection unit 112 is not included in the playback apparatus, not shown.

The foregoing configuration permits the viewer to view a more optimal picture.

Fourth Embodiment

Figure 11:
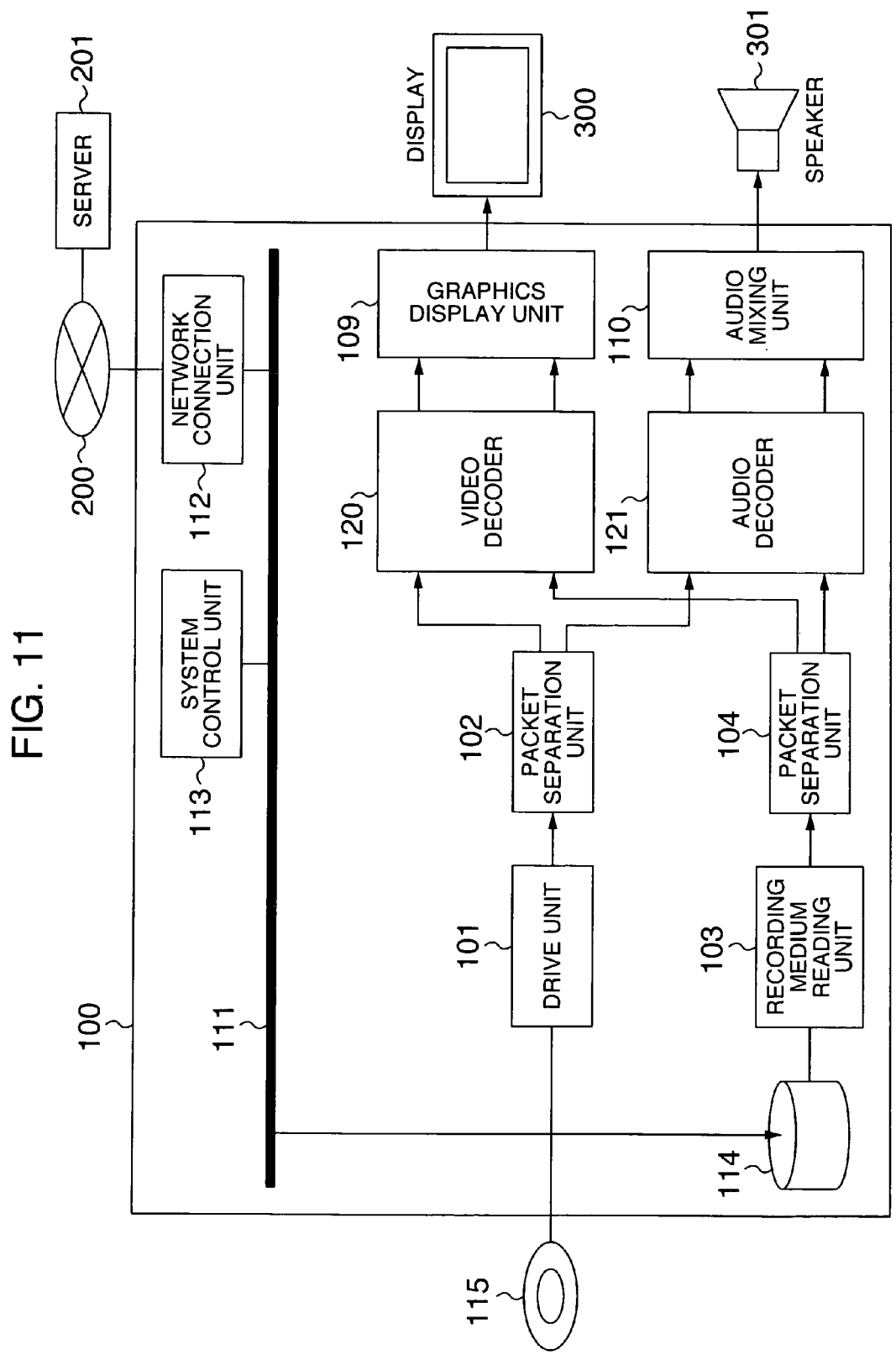
FIG. 11 illustrates a picture played back in a fourth embodiment of the present invention.
Figure 12:
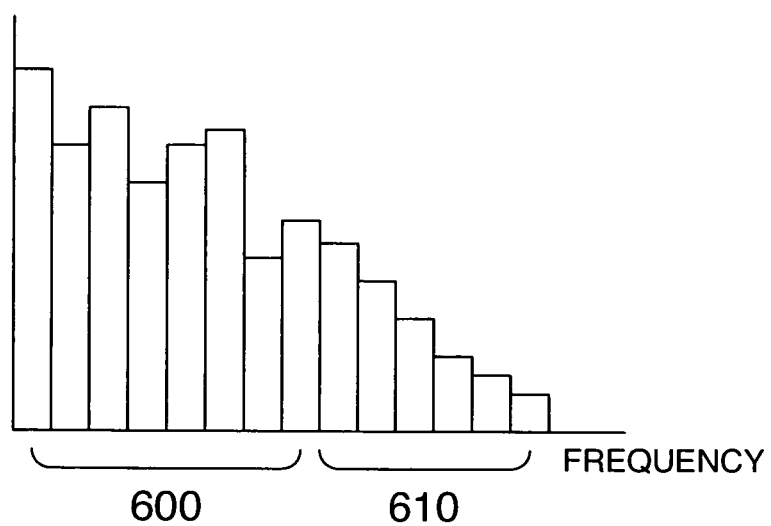
FIG. 12 shows exemplary frequency bands in the fourth embodiment of the present invention.

FIG. 11 illustrates a playback apparatus according to a fourth embodiment of the present invention, In FIG. 11, parts identical to those in FIG. 1 are designated the same reference numerals, and are omitted in the following description. A video decoder 120 receives video streams from a packet separation unit 102 and a packet separation unit 104, and decodes these video streams to generate video signals. An audio decoder 121 receives audio streams from the packet separation unit 102 and packet separation unit 104, and decodes these audio streams to generate audio signals. In this event, the video stream outputted by the packet separation unit 102 has lower frequency components of a picture, while the video stream outputted by the packet separation unit 104 has higher frequency components of the same picture. FIG. 12 shows exemplary frequency bands of the respective streams. In FIG. 12, a frequency band 600 is outputted from the packet separation unit 102, and a frequency band 610 is outputted from the packet separation unit 104. An example of video encoding which involves such a division of frequency bands is the space scalability in MPEG-2.

In the foregoing configuration, pictures at a lower resolution and a lower bit rate can be recorded in the disk 115 for a longer time than when pictures are recorded at a normal bit rate. Depending on the user's wish, information of the high frequency components recorded in the server 201 can be multiplexed to provide the user with a convenience of viewing a high resolution picture.

While we have shown and described several embodiments in accordance with our invention, it should be understood that the disclosed embodiments are susceptible to changes and modifications without departing from the scope of the invention. Therefore, we doe not intend to be bound by the details shown and described herein but intend to cover all such changes and modifications that fall within the ambit of the appended claims.

The invention claimed is:

1. A playback apparatus for playing back a first stream written into a recording medium and a second stream different from the first stream, each of the first and second streams containing video data, comprising:
a first playback module which plays back the first stream;
a second playback module which plays back the second stream;
an output module which outputs played-back information played-back by the first or second playback module;

a network connection module which is connected to a network; and a control module which controls each of said first and second playback modules, said output module and said network connection module, wherein:

in a case where the first stream is played back by said first playback module, said control module sends identification information of the recording medium to a server via said network connection module and the network, and said control module obtains, from the server via the network and said network connection module, the second stream and control information relating to an output position and an output timing of played-back information at a time of playing back the second stream which is selected and transmitted from the server in accordance with a number of times of playback of the first stream performed by said playback apparatus stored in the server based on the identification information of the recording medium transmitted to the server, and said control module controls said first and second playback modules so as to superimpose one of the played-back information of the first stream and the second stream on another of the played-back information of the first stream and the second stream based on the control information and output the played-back information of the first and second streams thus superimposed from said output module.

2. The playback apparatus according to claim 1, wherein date and time at which the first stream is played back is transmitted to the server via the network and said network connection module, and contents of the second stream obtained from the server via the network and said network connection module is changed in accordance with the date and time at which the first stream is played back.

3. A playback apparatus according to claim 2, wherein at a time of superimposing one of the played-back information of the first stream and the second stream on another of the played-hack information of the first stream and the second stream and playing back the superimposed played-back information of the first and second streams, the superimposed played-back information of the first and second streams is played-back in a manner that the played-back information of the first stream is complemented by the played-back information of the second stream.

4. A playback apparatus according to claim 2, wherein:

each of the first and second streams contains sound data, and the second stream cancels out a part of the sound data of the first stream in accordance with an operation of a viewer.

5. A playback apparatus according to claim 1, wherein at a time of superimposing one of the played-back information of the first stream and the second stream on another of the played-back information of the first stream and the second stream and playing back the superimposed played-back information of the first and second streams, the superimposed played-back information of the first and second streams is played-back in a manner that the played-back information of the first stream is complemented by the played-back information of the second stream.

6. A playback apparatus according to claim 1, wherein:

each of the first and second streams contains sound data, and the second stream cancels out a part of the sound data of the first stream in accordance with an operation of a viewer.

7. The playback apparatus according to claim 1, wherein a number of times the first stream is played back is transmitted to the server via the network and said network connection module, and contents of the second stream obtained from the server via the network and said network connection module is changed in accordance with the number of times the first steam is played back.

8. A method of playing back a first stream written into a recording medium and a second stream different from the first stream, each of the first and second streams containing video data, comprising:

a first playing back step of playing back the first stream;

a second playing back step of playing back the second stream;

an outputting step of outputting played-back information played-back by the first or second playing back step;

a step of connecting to a network;

in a case where the first stream is played back by said first playing back step, a step of sending identification information of the recording medium to a server via the network, and obtaining, from the server via the network, the second stream and control information relating to an output position and an output timing of played-back information at a time of playing back the second stream which is selected and transmitted from the server in accordance with a number of times of playback of the first stream performed stored in the server based on the identification information of the recording medium transmitted to the server; and a step of superimposing one of the played-back information of the first stream and the second stream on another of the played-back information of the first stream and the second stream based on the control information and outputting the played-back information of the first and second streams thus superimposed.

9. The playback method according to claim 8, wherein date and time at which the first stream is played back is transmitted to the server via the network and said network connection module, and contents of the second stream obtained from the server via the network and said network connection module is changed in accordance with the date and time at which the first stream is played back.

10. A playback method according to claim 9, wherein at a time of superimposing one of the played-back information of the first stream and the second stream on another of the played-back information of the first stream and the second stream and playing back the superimposed played-back information of the first and second streams, the superimposed played-back information of the first and second streams is played-back in a manner that the played-back information of the first stream is complemented by the played-hack information of the second stream.

11. A playback method according to claim 9, wherein:

each of the first and second streams contains sound data, and the second stream cancels out a part of the sound data of the first stream in accordance with an operation of a viewer.

12. A playback method according to claim 8, wherein at a time of superimposing one of the played-back information of the first stream and the second stream on another of the played-back information of the first stream and the second stream and playing back the superimposed played-back information of the first and second streams, the superimposed played-back information of the first and second streams is played-hack in a manner that the played-back information of the first stream is complemented by the played-hack information of the second stream.

13. A playback method according to claim 8, wherein:
each of the first and second streams contains sound data, and
the second stream cancels out a part of the sound data of the first stream in accordance with an operation of a viewer.

14. The playback method according to claim 8, wherein a number of times the first stream is played back is transmitted to the server via the network and said network connection module, and
contents of the second stream obtained from the server via the network and said network connection module is changed in accordance with the number of times the first steam is played back.

15. A method of recording a first stream into a recording medium and a second stream different from the first stream, each of the first and second streams containing video data, comprising:
a first recording step of recording the first stream;
a second recording step of recording the second stream;
a step of connecting to a network;
in a case where the first stream is recorded by said first recording step, a step of sending identification information of the recording medium to a server via the network, and obtaining, from the server via the network, the second stream and control information relating to an output position and an output timing of played-back information at a time of playing back the second stream which is selected and transmitted from the server in accordance with a number of times of playback of the first stream performed stored in the server based on the identification information of the recording medium transmitted to the server; and
a step of superimposing one of the played-back information of the first stream and the second stream on another of the played-back information of the first stream and the second stream based on the control information and outputting and recording the played-back information of the first and second streams thus superimpose.

16. The recording method according to claim 15, wherein date and time at which the first stream is played back is transmitted to the server via the network and said network connection module, and
contents of the second stream obtained from the server via the network and said network connection module is changed in accordance with the date and time at which the first stream is played back.

17. A recording method according to claim 16, wherein at a time of superimposing one of the played-back information of the first stream and the second stream on another of the played-back information of the first stream and the second stream and playing back the superimposed played-back information of the first and second streams, the superimposed played-back information of the first and second streams is played-back in a manner that the played-back information of the first stream is complemented by the played-back information of the second stream.

18. A recording method according to claim 16, wherein:
each of the first and second streams contains sound data, and
the second stream cancels out a part of the sound data of the first stream in accordance with an operation of a viewer.

19. A recording method according to claim 15, wherein at a time of superimposing one of the played-back information of the first stream and the second stream on another of the played-back information of the first stream and the second stream and playing back the superimposed played-back information of the first and second streams, the superimposed played-back information of the first and second streams is played-back in a manner that the played-back information of the first stream is complemented by the played-hack information of the second stream.

20. A recording method according to claim 15, wherein:
each of the first and second streams contains sound data, and
the second stream cancels out a part of the sound data of the first stream in accordance with an operation of a viewer.

* * * * *